(12) United States Patent
Seo et al.

(10) Patent No.: US 7,145,890 B1
(45) Date of Patent: Dec. 5, 2006

(54) METHOD FOR CARRYING OUT HANDOFF BETWEEN MACROCELL AND MICROCELL IN HIERARCHICAL CELL STRUCTURE

(75) Inventors: Sang-Hoon Seo, Kyoungki-do (KR); Tae-Gue Kim, Kyoungki-do (KR); Tae-Hoon Park, Kyoungki-do (KR); In-Hong Lee, Kyoungki-do (KR); Sun Park, Kyoungki-do (KR)

(73) Assignee: SK Telecom Co. Ltd (KR)

( * ) Notice: Subject to any disclaimer, the term of this patent is extended or adjusted under 35 U.S.C. 154(b) by 901 days.

(21) Appl. No.: 09/807,060

(22) PCT Filed: Aug. 9, 2000

(86) PCT No.: PCT/KR00/00874

§ 371 (c)(1),
(2), (4) Date: Jul. 16, 2001

(87) PCT Pub. No.: WO01/11804

PCT Pub. Date: Feb. 15, 2001

(30) Foreign Application Priority Data

Aug. 9, 1999 (KR) ............................ 1999-32508

(51) Int. Cl.
*H04Q 7/00* (2006.01)
(52) U.S. Cl. .................. 370/331; 370/332; 455/444
(58) Field of Classification Search ............... 370/331, 370/328, 335, 344, 329, 332; 455/436, 525, 455/444, 422.1
See application file for complete search history.

(56) References Cited

U.S. PATENT DOCUMENTS

| 5,278,991 | A | | 1/1994 | Ramsdale et al. ......... 455/33.2 |
| 5,542,098 | A | * | 7/1996 | Bonta ........................ 455/434 |
| 5,548,806 | A | | 8/1996 | Yamaguchi et al. ....... 455/33.1 |
| 5,987,332 | A | | 11/1999 | Gettleman et al. |
| 6,085,091 | A | * | 7/2000 | Yoo et al. .................. 455/441 |
| 6,141,554 | A | * | 10/2000 | Choi .......................... 455/436 |
| 6,178,197 | B1 | * | 1/2001 | Froelich et al. ............. 375/150 |
| 6,771,963 | B1 | * | 8/2004 | Cheng et al. ............... 455/437 |
| 6,873,647 | B1 | * | 3/2005 | Tiedemann et al. ......... 375/145 |

FOREIGN PATENT DOCUMENTS

CN 1212593 A 3/1999

(Continued)

*Primary Examiner*—Duc Ho
(74) *Attorney, Agent, or Firm*—Blakely Sokoloff Taylor & Zafman

(57) ABSTRACT

A method for carrying out an idle handoff from a macrocell to a microcell (picocell) in a hierarchical cell structure includes the steps of: a) allocating different frequency assignments (FA) to the macrocell and the microcell in a same service band, to construct the hierarchical cell structure; b) transmitting cell structure information of neighboring base stations and pseudo noise (PN) code from base station to mobile station; c) checking whether the mobile station is in the hierarchical cell by using the cell structure information of neighboring base station; and d) checking whether a value of the pseudo noise (PN) code is greater than T_ADD and greater than Ec/Io of the macrocell by periodically searching the pseudo noise (PN) code of the microcell, to carry out an idle handoff to the microcell, wherein the T_ADD represents a value of base station pilot strength required for the base station of neighboring set to be included in a candidate set, the Ec represents an pilot energy accumulated during one pseudo noise (PN) chip period, and the Io represents a total power spectrum density within a reception bandwidth.

30 Claims, 10 Drawing Sheets

FOREIGN PATENT DOCUMENTS

| | | |
|---|---|---|
| KR | 99-0038047 | 6/1999 |
| KR | 1999-0055979 | 7/1999 |
| WO | WO 95/35604 | 12/1995 |

* cited by examiner

NEIGHBOR LIST MESSAGE

NEIGHBORING BASE STATION
STATE (NGHBR_CONFIG)

100 : MICROCELL(PICOCELL) EXISTING WITHIN MACROCELL
101 : MACROCELL EXISTING OUTSIDE THE MICROCELL(PICOCELL)

FIG. 4

PILOT STRENGTH MEASUREMENT MESSAGE

MSG_TYPE  00000101
ACK_SEQ
MSG_SEQ
ACK_REQ
ENCRYPTION
REF_PN
PILOT_STRENGTH
KEEP

PILOT_PN_PHASE
PILOT_STRENGTH
KEEP

RESERVED

METHOD FOR CARRYING OUT HANDOFF BETWEEN MACROCELL AND MICROCELL IN HIERARCHICAL CELL STRUCTURE

TECHNICAL FIELD

The present invention relates to a handoff method in a radio communication system and a record medium capable of being read through a computer having a record of a program to realize the inventive method; and, more particularly, to a method for carrying out a handoff between a macrocell and a microcell in a hierarchical cell structure of a radio communication system, and a record medium capable of being read through a computer having a record of a program to realize the inventive method.

BACKGROUND ART

In general, there may exist complicatedly a macrocell, a microcell and a picocell in the same service band, in constructing hierarchical cells in a radio communication system.

Describing a case of the macrocell as an upper cell and the microcell as a lower cell, the same service band indicates any one service band out of communicating methods having mutually different service bands such as a cellular movable communication based on a code division multiplexing access (CDMA), a personal communication system (PCS) etc.

At these days, a global system for mobile communication (GSM) employs a hierarchical cell structure between a pacific digital cellular (PDC) and a personal handyphone system (PHS). However, the GSM hierarchical cell structure is provided to form hierarchical cells between mutually different service bands to which mutually different frequency bands are allocated.

Meantime, there is also much even in the CDMA system a concept of forming the hierarchical cell between the mutually different service bands. That is, at present, it is classified into the cellular mobile communication service band, a PCS service band and a next generation mobile communication (IMT-2000) service band, to apply them to the hierarchical cell structure through a lot of research.

However, it is getting required a handoff system between the hierarchical cells, which is applicable to the respective service bands such as the same cellular mobile communication service band, the PCS service band and the next generation mobile communication (IMT-2000) service band etc. Further, it be getting required a function in which a service for the macrocell and the microcell is valid with a single mode mobile station not a double mobile station structure and a handoff between the macrocell and the microcell can be supported.

DISCLOSURE OF THE INVENTION

Therefore, it is an object of the present invention to provide a method for carrying out a handoff between a macrocell and a microcell in a hierarchical cell structure of a radio communication system, and a record medium capable of being read through a computer having a record of a program to realize the inventive method.

In accordance with the present invention for achieving the above object, the method for carrying out an idle handoff from a macrocell to a microcell (picocell) in a hierarchical cell structure, includes a first step of providing different frequency assignments (FA) to the macrocell and the microcell in a same service band, to construct the hierarchical cell structure; a second step of transmitting cell structure information of neighboring base stations and a pseudo noise (PN) code, from a base station to a mobile station; a third step of checking whether the mobile station for receiving a service through the macrocell is in the hierarchical cell by using the cell structure information of the neighboring base station; and a fourth step of checking whether a value of the pseudo noise (PN) code is greater than T_ADD and greater than Ec/Io of the macrocell, by periodically searching the pseudo noise (PN) code of the microcell, to carry out the idle handoff to the microcell, wherein the T_ADD represents a value of a base station pilot strength required for the base station of a neighboring set to be included in a candidate set, the Ec represents pilot energy accumulated during one pseudo noise (PN) chip period, and the Io indicates a total power spectrum density within a reception bandwidth of the macrocell.

Further, in the invention, the method for carrying out the idle handoff from the microcell (picocell) to the macrocell in the hierarchical cell structure, includes a first step of providing different frequency assignments (FA) to the macrocell and the microcell (picocell) in a same service band, to construct the hierarchical cell structure; a second step of transmitting cell structure information of neighboring base stations and a pseudo noise (PN) code from the base station to the mobile station; a third step of checking whether the mobile station for receiving a service through the microcell (picocell) thereof is in the hierarchical cell, by using the cell structure information of the neighboring base station; a fourth step of deciding a time point of searching for a signal of the macrocell according to a pilot signal strength of a microcell signal; and a fifth step of checking whether a value of the pseudo noise (PN) code is greater than T_ADD and greater than Ec/Io of the macrocell by periodically searching the pseudo noise (PN) code of the macrocell, to carry out the idle handoff to the macrocell, wherein the T_ADD represents a value of a base station pilot strength required for the base station of a neighboring set to be included in a candidate set, the Ec represents pilot energy accumulated during one pseudo noise (PN) chip period, and the Io indicates a total power spectrum density within a reception bandwidth of the macrocell.

In the invention, additionally, the method for carrying out a handoff in traffic from the macrocell to the microcell (picocell) in the hierarchical cell structure, is made up of a first step of providing different frequency assignments (FA) to the macrocell and the microcell (picocell) in a same service band, to construct the hierarchical cell structure; a second step of transmitting cell structure information of neighboring base stations and a pseudo noise (PN) code from a base station to a mobile station; a third step of checking whether the mobile station in traffic in the macrocell is in the hierarchical cell, by using the cell structure information of the neighboring base station; and a fourth step of checking whether a value of the pseudo noise (PN) code is greater than T_ADD by periodically searching the pseudo noise (PN) code of the microcell, to carry out the handoff in traffic to the microcell.

In the present invention, moreover, the method for carrying out the handoff in traffic from the microcell (picocell) to the macrocell in the hierarchical cell structure, includes a first step of providing different frequency assignments (FA) to the macrocell and the microcell (picocell) in a same service band, to construct the hierarchical cell structure; a second step of transmitting cell structure information of neighboring base stations and a pseudo noise (PN) code, from a base station to a mobile station; a third step of checking whether the mobile station for receiving a service through the microcell (picocell) thereof is in the hierarchical cell, by using the cell structure information of the neighboring base station; a fourth step of deciding a time point of searching for a signal of the macrocell according to a pilot signal strength of a microcell signal; and a fifth step of checking whether a value of the pseudo noise (PN) code is greater than T_ADD, by periodically searching the pseudo noise (PN) code of the macrocell, to carry out the handoff in traffic to the macrocell.

In the invention, furthermore, the method for carrying out a handoff between an upper cell and a lower cell in the hierarchical cell structure, is composed of a first step of providing different frequency assignments (FA) to the upper cell and the lower cell in a same service band, to construct a hierarchical cell; and a second step of confirming the hierarchical cell according to cell structure information of neighboring base stations, searching for a PN code of a movement cell, and performing the handoff.

In accordance with the invention, also, in the record medium capable of being read through a computer, in a radio communication system having a microprocessor for the idle handoff from the macrocell to the microcell (picocell) in the hierarchical cell structure, it is provided by a characteristic that the computer has a record of a program to realize a first function of providing different frequency assignments (FA) to the macrocell and the microcell (picocell) in a same service band, to construct a hierarchical cell; a second function of transmitting cell structure information of neighboring base stations and a pseudo noise (PN) code, from a base station to a mobile station; a third function of checking whether the mobile station for receiving a service through the macrocell is in the hierarchical cell, by using the cell structure information of the neighboring base station; and a fourth function of checking whether a value of the pseudo noise (PN) code is greater than T_ADD and greater than Ec/Io of the macrocell, by periodically searching the pseudo noise (PN) code of the microcell, to carry out the idle handoff to the microcell.

In accordance with the present invention, further, in the record medium capable of being read through the computer, in the radio communication system having the microprocessor for the idle handoff from the microcell (picocell) to the macrocell in the hierarchical cell structure, it is provided by a characteristic that the computer has the record of the program to realize a first function of providing different frequency assignments (FA) to the macrocell and the microcell (picocell) in a same service band, to construct a hierarchical cell; a second function of transmitting cell structure information of neighboring base stations and a pseudo noise (PN) code, from a base station to a mobile station; a third function of checking whether the mobile station for receiving a service through the microcell (picocell) is in the hierarchical cell, by using the cell structure information of the neighboring base station; a fourth function of deciding a time point to find out a signal of the macrocell according to a pilot signal strength of the microcell signal; and a fifth function of checking whether a value of the pseudo noise (PN) code is greater than T_ADD and greater than Ec/Io of the microcell, by searching the pseudo noise (PN) code of the macrocell, to carry out the idle handoff to the macrocell.

Also, in the record medium capable of being read through the computer, in the radio communication system having the microprocessor for the handoff in traffic from the macrocell to the microcell (picocell) in the hierarchical cell structure, it is provided by a characteristic that the computer has the record of the program to realize a first function of providing different frequency assignments (FA) to the macrocell and the microcell (picocell) in a same service band, to construct a hierarchical cell; a second function of transmitting cell structure information of neighboring base stations and a pseudo noise (PN) code, from a base station to a mobile station; a third function of checking whether the mobile station communicating with the macrocell is in the hierarchical cell, by using the received cell structure information of the neighboring base station; and a fourth function of checking whether a value of the pseudo noise (PN) code is greater than T_ADD, by periodically searching the pseudo noise (PN) code of the microcell, to carry out the handoff in traffic to the microcell.

Additionally, in the record medium capable of being read through the computer, in the radio communication system having the microprocessor for the handoff in traffic from the microcell (picocell) to the macrocell in the hierarchical cell structure, it is provided by a characteristic that the computer has the record of the program to realize a first function of providing different frequency assignments (FA) to the macrocell and the microcell (picocell) in a same service band, to construct a hierarchical cell; a second function of transmitting cell structure information of neighboring base stations and a pseudo noise (PN) code, from a base station to a mobile station; a third function of checking whether the mobile station for receiving a service through the microcell (picocell) is in the hierarchical cell, by using the received cell structure information of the neighboring base station; a fourth function of deciding a time point to find out a signal of the macrocell according to a pilot signal strength of a microcell signal; and a fifth function of checking whether a value of the pseudo noise (PN) code is greater than T_ADD, by periodically searching the pseudo noise (PN) code of the macrocell, to carry out the handoff in traffic to the macrocell.

Moreover, in the record medium capable of being read through the computer, in the radio communication system having the microprocessor for the handoff between the upper cell and the lower cell in the hierarchical cell structure, it is provided by a characteristic that the computer has the record of the program to realize a first function of providing different frequency assignments (FA) to the upper cell and the lower cell in a same service band, to construct a hierarchical cell; and a second function of clarifying the hierarchical cell according to cell structure information of neighboring base stations, searching for a PN code of a movement cell, and performing the handoff.

BRIEF DESCRIPTION OF DRAWINGS

The above and other objects and features of the instant invention will become apparent from the following description of preferred embodiments taken in conjunction with the accompanying drawings, in which:

FIG. 4 represents an explanatory drawing providing a field change portion of a pilot strength measurement message in one embodiment of the invention;

BEST MODE FOR CARRYING OUT THE INVENTION

Figure 1:
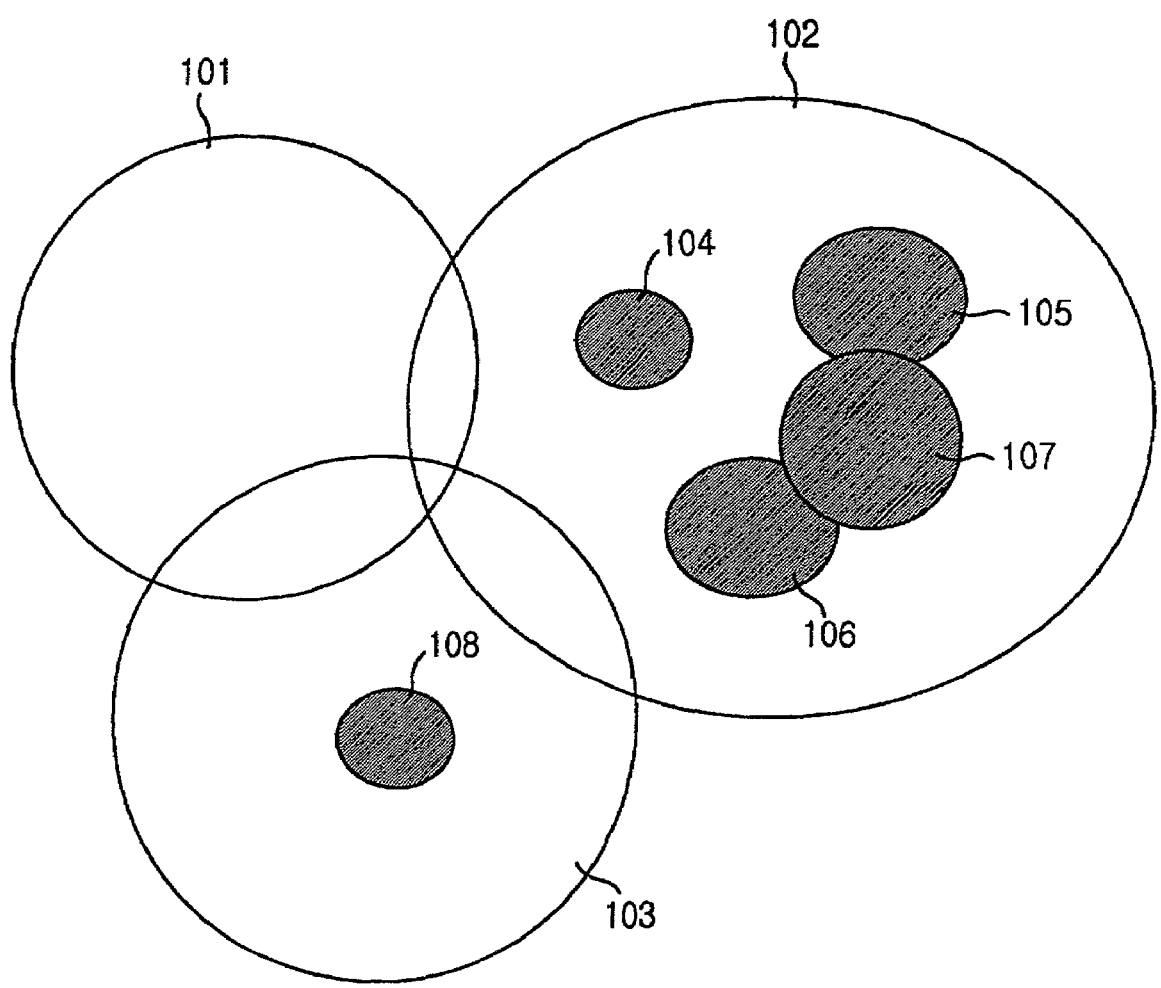
FIG. 1 is a diagram showing a hierarchical cell structure constructed by a macrocell and a microcell in accordance with the present invention.

Hereinafter, preferred embodiments of the present invention will be described in detail with reference to the accompanying drawings.

Describing a radio data service proposed in the IS-95B etc. in detail, it is a tendency of being changed from a voice service to a voice and data service as the first consideration. According to that, a concept of a macrocell should be advanced to a microcell and to a picocell more. Therefore, cellular moving communication enterprisers or PCS enterprisers etc. should provide all the voice and data services by utilizing frequency resources given, and for that, the macrocell must be advanced to the microcell or the picocell.

At this time, if the same frequency assignment (FA) is provided to the macrocell and the microcell (picocell), the following problems occur. For example, in case that a service is provided through different pseudo noise (PN) codes in the same frequency assignment (FA), the number of the overall used frequency assignments (FA) must be same between the macrocell and the microcell (picocell) so that the service can be supplied in all mobile stations, which causes a waste in a hardware.

Thus, in order to provide more smooth and various service in accordance with the present invention, mutually different frequency is allocated to bandwidths of the macrocell and the microcell. Herewith, subscribers using a high speed service of a voice as the first consideration are serviced in the macrocell and subscribers using a high speed service of the data and voice etc. are serviced in the microcell.

In order for a smooth hard handoff between the mutually different frequency allocated to the macrocell and the microcell (picocell), a pilot beacon may be used. However, in this case, the mobile station may not find out a channel which must be acquired by itself, from a channel list received through an initial system parameter message. In other words, when all the channels used in the macrocell and the microcell is sent to the channel list message, the mobile station has an execution for its own number and hashing function referring to the channel list and is moved to a CDMA channel to be serviced. At this time, in case the mobile station is assigned to a channel of the microcell and exists in the macrocell, a corresponding channel is used as a beacon in the macrocell thus the mobile station performs an initial state repeatedly, continuously. Therefore, there may be a problem that the mobile station may not be serviced.

That is, in the invention, frequency of the macrocell and frequency of the microcell (picocell) are allocated in cross to a primary channel and a secondary channel of a number assignment module (NAM) so that respective cells may be distinguished from one another, thereby the service can be provided to a single mode mobile station in a hierarchical cell structure in which frequency is differently assigned to the microcell of the same service band.

In other words, in the invention, a hand-off method to provide a hierarchical cell service to the single mode mobile station not a dual-mode mobile station is gotten by differently providing the FAs in the same service band.

FIG. 1 is a diagram showing a hierarchical cell structure constructed by a macrocell and a microcell in one embodiment of the present invention.

An overall service area generally includes areas where the macrocell and the microcell (picocell) exist, and also may have a hierarchical cell. However, it is considered only a type of the hierarchical cell overlapped with the macrocell in one embodiment of the present invention, which is why the microcell is positioned in the inside of the existing macrocell in considering a hierarchical cell service being currently provided.

In FIG. 1, reference numbers 101 through 103 represent the macrocells, and 104 to 108 indicate the microcells (picocells) Thus, the mobile station should be valid to provide a service to an overall network in all positions regardless of the mobile station own position. For that, a method that a mobile station initially selects a service cell, and a handoff method in an idle state or a traffic state, become an important point.

What the mobile station simply receives the service by matching a synchronization with a base station, is progressed equally to the existing method, that is, it is valid since all the same frequency bands are sequentially used for overall cells. For that, a primary channel and a secondary channel are sequentially determined in a memory element such as an Electrically Erasable Programmable Read Only Memory (EEPROM). For instance, in the 'SK TELECOM CO., LTD' who provides a CDMA cellular service, a 779 channel and a 738 channel are determined respectively as the primary channel and the secondary channel.

As shown in FIG. 1, in a case of an advancement to a hierarchical cell type, and in case the macrocell and the microcell (picocell) use the same FA, it occurs much difficulty in an aspect of a radio frequency (RF) engineering. For example, the CDMA system basically has an electric power control, thus the mobile station performs the power control at individual position according to a strength of signals. Meantime, in case that the microcell (picocell) exists on an almost outside of the macrocell and the mobile station is not serviced to the microcell (picocell), the mobile station receives the power control of the macrocell to output a signal. At this time, the same FA is utilized, thus an influence of the macrocell is affected upon the adjacent microcell (picocell) very strongly, and therefore, a capacity of the microcell may be largely dropped according to some cases and many problems may further occur in a forward direction aspect.

For settling it, in a case of the hierarchical structure of the macrocell and the microcell (picocell) in the same CDMA service band, mutually different FAs must be used to gain a distinction between them.

Figure 2:
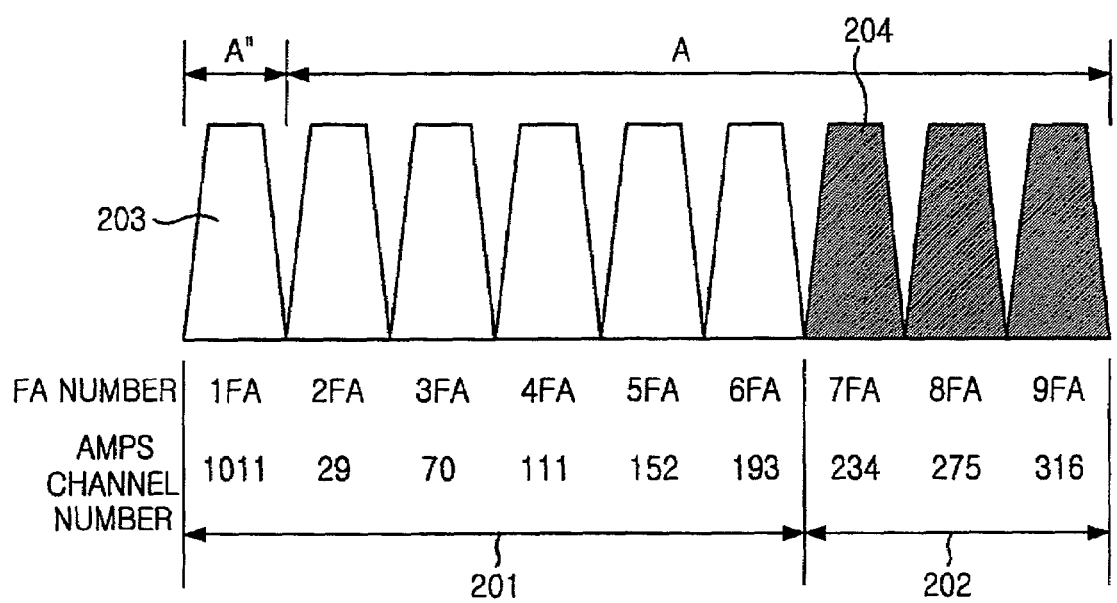
FIG. 2 is a diagram showing a primary channel assignment and a frequency assignment (FA) in which frequency is differently assigned to a macrocell and a microcell in the same service band, in one embodiment of the present invention.

FIG. 2 is a diagram showing a primary channel assignment and a frequency assignment (FA) in which frequency is differently assigned to a macrocell and a microcell in the same service band in one embodiment of the present invention.

FIG. 2 shows, as one example, channel numbers of an analog cellular system (AMPS) matched with a digital CDMA cellular band frequency assignment (FA) being used currently. FIG. 2 can be applied to the existing system and can be also applied to a newly allocated CDMA band. Thus, it is herewith assumed that it is a simply allocated CDMA band and the number of usable frequency assignments (FA) is nine.

1FA through 6FA are allocated as a band used in the macrocell, and 7FA through 9FA are allocated as a band used in the microcell (picocell). Though all nine FAs were conventionally used in the macrocell, a concept of the microcell (picocell) is applied to an overpopulated area such as downtown areas and the interior of an office such as buildings. Therefore, in order to progress more efficient hierarchical cell structure and in considering a hierarchical cell based on a type of differently providing the FAs, the FA of the macrocell and the microcell (picocell) is performed as shown in FIG. 2, in the hierarchical cell structure like FIG. 1.

At this time, in order to service all two bands of the macrocell and the microcell, a mode of the mobile station should be changed to a dual-mode or its software should be changed. According to that, a number assignment module (NAM) program of the mobile station is upgraded as follows, to provide the hierarchical cell service by using the existing mobile station.

As shown in FIG. 2, in the mobile station for the macrocell, 1FA 203 and an AMPS channel number 1011 are allocated as the primary channel, and 7FA 204 and an AMPS channel number 234 are allocated as the secondary channel. When it becomes an initial state, the mobile station first searches for the primary channel to firstly register in the macrocell and receive a service. Just, when only a signal of the microcell (picocell) is entered from the hierarchical cell, the mobile station for the macrocell searches for the secondary channel to register in the microcell (picocell).

In the meantime, in the mobile station for the microcell (picocell) oppositely to the macrocell, 7FA 204 and the AMPS channel number 234 are allocated as the primary channel, and 1FA 203 and the AMPS channel number 1011 are allocated as the secondary channel. When it becomes the initial state, it is first searched the primary channel programmed in the EEPROM wherever the mobile station is positioned, and if existing, a registration in the microcell (picocell) is performed, and if not existing, the secondary channel is searched to perform the registration in the macrocell.

For instance, in case that the mobile station is positioned in the microcell 104 of FIG. 1 and frequency for the macrocell is assigned to the primary channel, a signal of the macrocell 102 exists herein since the microcell 104 is the microcell (picocell) existing in the inside of the macrocell 102. Therefore, when the initialization is required, the mobile station searches for a signal of 1FA 203 of the macrocell as its own primary channel, to meet a synchronization and decide a system of the macrocell.

Meanwhile, in case that the mobile station exists at a position of the microcell 104 and the frequency for the microcell (picocell) is assigned to the primary channel, the primary channel of the mobile station is 1FA 204 of the microcell and this signal exists herein, so the mobile station searches for a pseudo noise (PN) code of this signal to acquire the synchronization and decide a system of the microcell (picocell).

If the mobile station allocating the frequency of the microcell to the primary channel exists at a spot having only the macrocell, the mobile station searches for the secondary channel, since there is no the signal when searching for the primary channel firstly. Since there is the signal in searching for the secondary channel, the mobile station meets the synchronization with it and decides the system as the macrocell.

In a considerable point to perform the handoff in a hierarchical structure of the macrocell and the microcell (picocell), it should be newly provided a routine on which a base station side changes or adds a parameter to be sent to the mobile station and the mobile station processes it. This can be gained by simply correcting only a software and by using a reserved parameter among the existing using parameters or newly adding it thereto.

Figure 3:
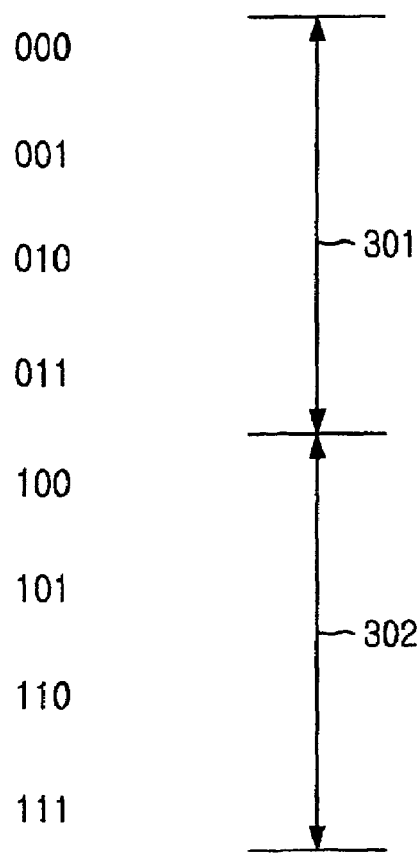
FIG. 3 is a diagram showing a neighbor list message in one embodiment of the present invention.

FIG. 3 is a diagram showing a neighbor list message in a paging channel from the base station to the mobile station, and a neighboring base station state NGHBR_CONFIG thereof indicates the configuration of adjacent cells, namely, an equal configuration existence or nonexistence of cells, an equality existence or nonexistence for the number of FAs of the cells, and an equality existence or nonexistence of a page channel. Herewith, in a commercialized system, four neighboring base station states 301 are used and four states 302 are not used. Therefore, the handoff can be progressed in respective cases by allocating and using 302 to the hierarchical cell structure.

While, a field can be additionally used in the configuration of mutually different cells. That is, when the FAs are differently provided to the hierarchical cell, 100 and 101 of FIG. 3 are used, and when the same FAs are provided to the hierarchical cell, other value among them can be used. Such decision and application must become a standardization. Just, the invention represents that this field can be utilized, a value for the corresponding construction can be changed and other construction can be added. At this time, since it is provided on the basis of a common use in all the mobile stations, a message capable of receiving at all the mobile stations must be selected. Herewith, an overhead channel message of a paging channel is used.

That is to say, in the invention, it is informed that the microcell exists in the inside of the macrocell, through the neighbor list message among the overhead message transmitted through the paging channel of the CDMA system from the base station to the mobile station, and then, the PN code according to that is transmitted; or it is informed that the microcell exists in the inside of the macrocell, by adding a new field, thus, through that field, and then, the PN code according to that is transmitted.

FIG. 4 is an explanatory diagram for a field change part of a pilot strength measurement message (PSMM) in the invention.

In FIG. 4, reserved bits are 0–7, and such value is currently set as 0. In the invention, however, it will be used a method that such value is transmitted as other value, for example, as 1, or is transmitted by allocating 1 to an end bit, Herein, a type of the PSMM is provided equally to the existing type, and the reserved bits in the field are used to represent a PSMM value of the hierarchical cell, and an MSG_TYPE can be used by an allocation of a currently unused value.

The handoff method in the hierarchical cell structure between the macrocell and the microcell (picocell), centering on a mobile station for use of the microcell (picocell), is described as follows, referring to FIGS. 5 to 10.

It is first described one embodiment of a parameter used in the present invention to decide a handoff.

In FIGS. 5 through 10, a T_ADD value indicates a value of a base station pilot strength to be satisfied so that an base station of a neighboring set enters a candidate set. An Ec/Io represents a rate of pilot energy Ec accumulated for one PN chip period against the total electric power spectrum density Io within a reception bandwidth. A T_Period indicates a value for searching for the PN of the microcell by a period of a constant time since it can not be continuously searched the microcell. A T_Drop value represents a lowest signal level value so that the base station remains in an active set. An Rx_T is a received power level threshold indicating a time point to find out a handoff signal. Further, a value of the T_Threshold may be between the T_ADD and the T_Drop, or may be a value decided separately, and also has a range.

Figure 5:
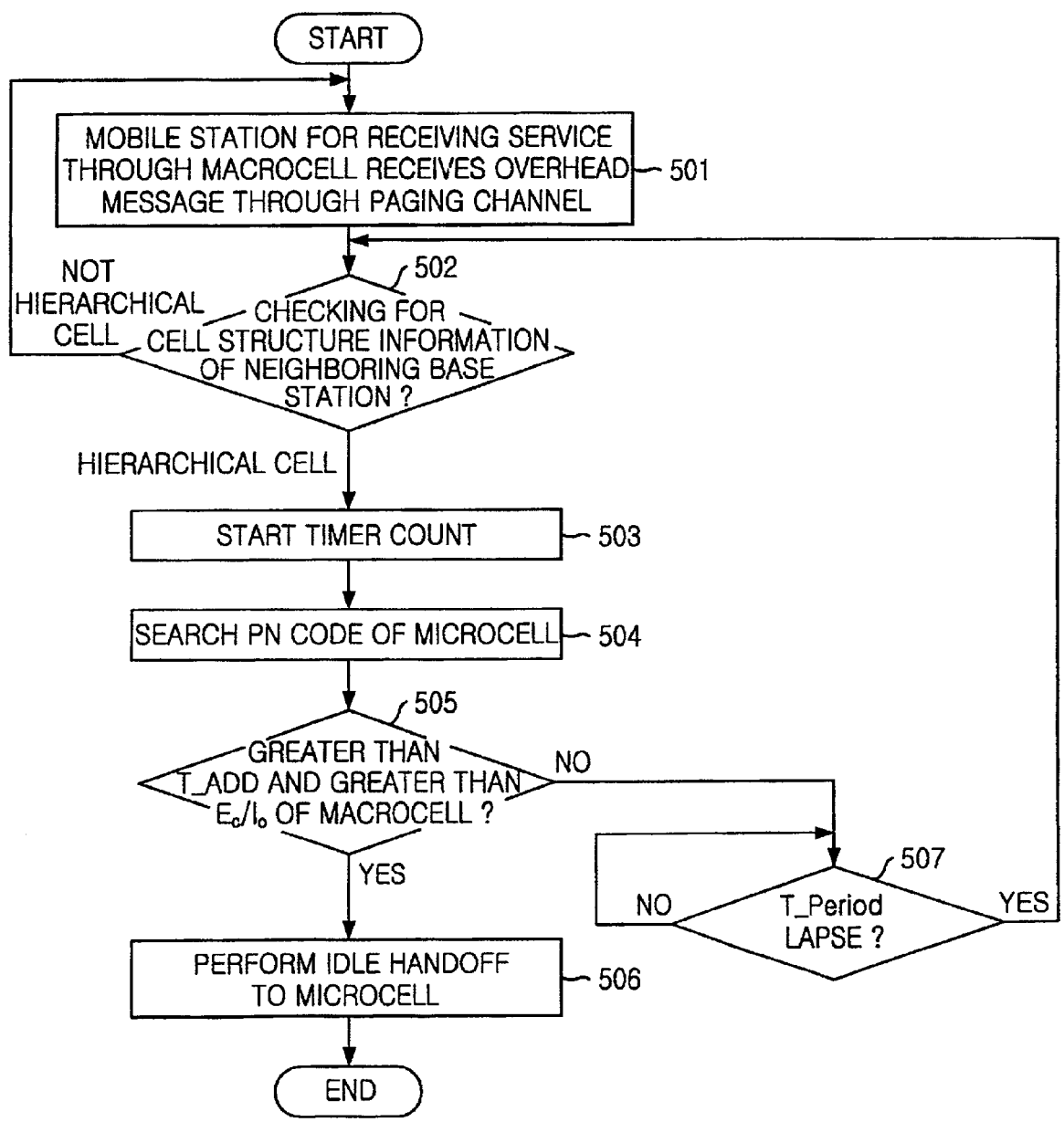
FIG. 5 indicates a flow chart showing a handoff method from a macrocell to a microcell in an idle state in one embodiment of the invention.

FIG. 5 is a flow chart showing the handoff method from the macrocell to the microcell (picocell) in an idle state in one embodiment of the invention, The handoff method from the macrocell to the microcell (picocell) in the idle state is the method applied when a user terminal is moved from the areas 101, 102 and 103 of the macrocell shown in FIG. 1 to the areas 104 through 108 of the microcell, and more in detail, is basically applied to a movement from the macrocell 102 to the microcell 104 through 107, or from the macrocell 104 to the microcell 108.

At this time, describing a case that the user terminal is moved to the area 104 through 107 of the microcell (picocell) under a state that only a signal of the macrocell 102 is searched and is registered in the macrocell, the user terminal receives cell structure information of neighboring base stations, such as information for advising that the microcell exists in the inside of the macrocell, through the paging channel, when the user terminal has a signal in the area 102 of the macrocell. Through that, it can be noted the type provided as the hierarchical cell as described in FIG. 3, and it can be also noted that its PN code is sent as a message.

Thus, the user terminal receives the signal for the cell structure information of the neighboring base stations, and from that time, monitors the primary channel of the microcell (picocell) by a time period of the T_Period. For such period, it can be continuously monitored according to a value of a slot cycle index, but this makes a life of a battery of the mobile station shortened in the idle state, furthermore, influences upon, not only the life of the mobile station but also a quality of products, in a traffic state in traffic.

Therefore, when the message of the hierarchical cell type is transferred through the cell structure information of the neighboring base station, the user terminal periodically searches for the PN code given from the primary channel of the microcell (picocell). If the searched result is greater than the T_ADD value and when the value is larger than the Ec/Io value of the macrocell, a mobile station mode is changed to the microcell (picocell), a synchronization is matched to a corresponding cell, and this is noted to the corresponding base station, so as to perform a registration. Namely, the idle handoff is performed.

With reference to FIG. 5, the mobile station serviced through the macrocell receives an overhead message through a paging channel in a step 501.

Cell structure information of the neighboring base stations contained into the neighbor list message is clarified in a step 502. If it is not the hierarchical cell type in the clarification result, the step 501 is again performed.

If it is the hierarchical cell type in the clarification result of the step 502, a timer count is started in a step 503.

A pseudo noise (PN) code of the microcell is searched for a constant time in a step 504.

In a step 505 it is decided whether a PN code value of the searched microcell is greater than T_ADD and larger than an Ec/Io value of the macrocell.

If the PN code value of the searched microcell is greater than T_ADD in the deciding result of the step 505 and larger than the Ec/Io value of the macrocell, in a step 506, an idle handoff is performed to the microcell so as to be serviced in the microcell.

If the requirement is not satisfied in the step 505, the service is continuously provided to the macrocell and simultaneously it is checked whether a timer count value lapses a T_Period value as a given PN searching period in a step 507. If lapsed in its result, it is repeatedly performed from the step 502 of clarifying the cell structure information of the neighboring base stations to check whether it exists within the hierarchical cell.

Figure 6:
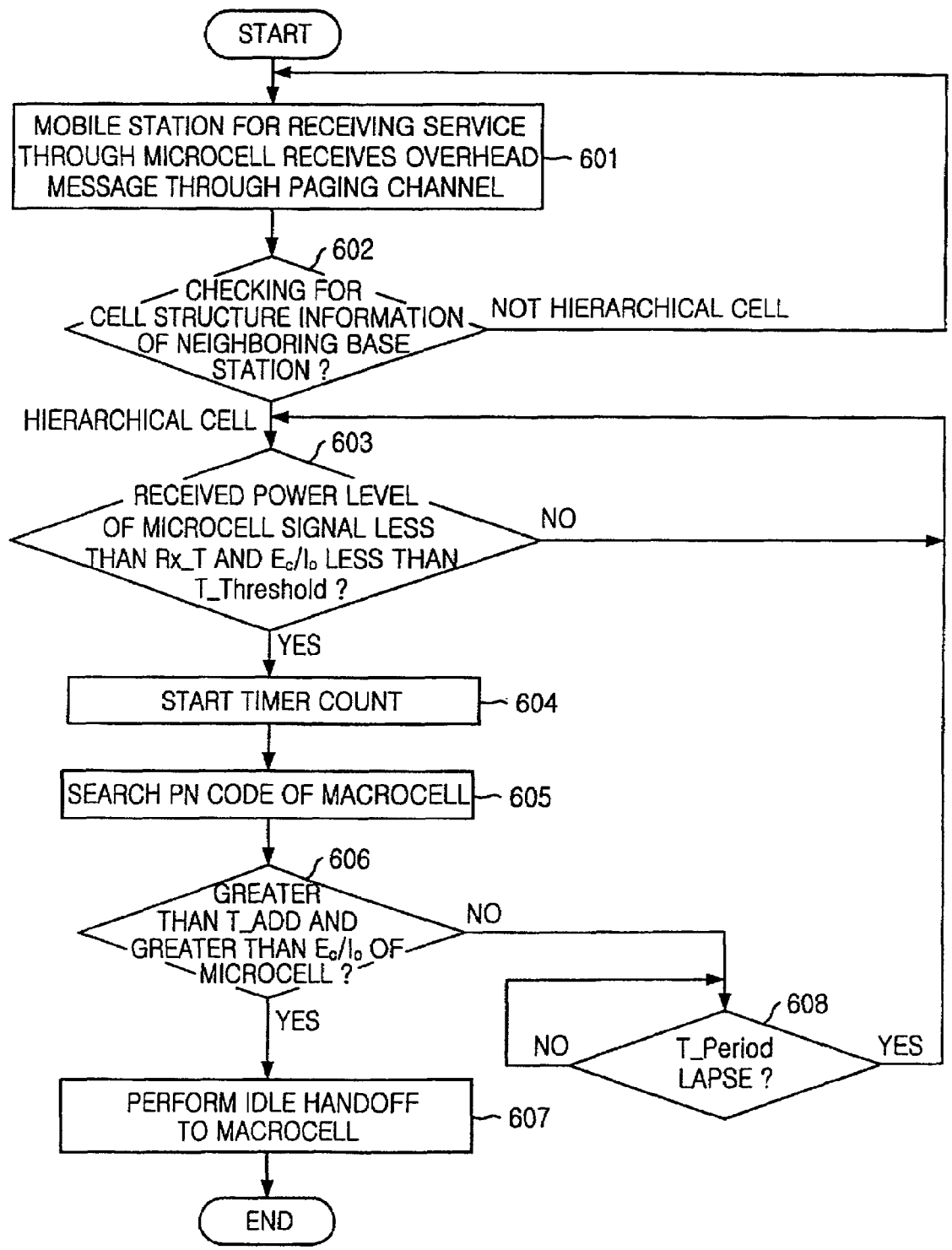
FIG. 6 depicts a flow chart showing a handoff method from a microcell to a macrocell in an idle state in one embodiment of the invention.

FIG. 6 is a flow chart showing a handoff method from a microcell (picocell) to a macrocell in an idle state in one embodiment of the invention.

When the user terminal exists in the area of the microcell, 104 through 107, the mobile station catches a signal of the microcell (picocell) and is matched to its synchronization. At this time, when the mobile station is moved to the area 102 of an outer macrocell, the mobile station recognizes that the macrocell exists outside. That is, the user terminal receives the cell structure information of the neighboring base stations such as information advising that the microcell exists within the macrocell, through the paging channel. Thereby, as shown in FIG. 3, it can be noted its hierarchical cell type and can be also noted that its PN code is provided as a message.

Therefore, when the user terminal receives a signal for the cell structure information of the neighboring base stations, it is checked whether a received power level of a microcell signal and a value of Ec/Io is lower than a given threshold, then the primary channel of the macrocell is monitored by a timing period of T_Period. In other words, when the microcell signal received power level of the mobile station is lower than a predetermined given threshold Rx_T and the Ec/Io value of the microcell becomes lower than a predetermined given threshold T_Threshold, the mobile station starts to count and searches for the PN code of the macrocell.

Then, when a value after periodically searching the PN code given from the primary channel of the macrocell is greater than a T_ADD value and this value is larger than the Ec/Io value, the mobile station modes FA and PN are changed to the macrocell and the synchronization is matched to a corresponding cell, and it is noted to a corresponding base station so as to register it. Namely, the idle handoff is done.

Referring to FIG. 6, the mobile station serviced through the microcell (picocell) receives an overhead message through a paging channel in a step 601.

The cell structure information of the neighboring base stations contained into the neighbor list message is clarified in a step 602. If it is not the hierarchical cell type in the clarification result, the step 601 is again performed.

If it is the hierarchical cell type in the clarification result, it is checked in a step 603 whether a received power level of a microcell signal is lower than a predetermined given threshold Rx_T and an Ec/Io value of the microcell is lower than a predetermined given threshold T_Threshold. If the condition is not satisfied in the checking result, the step 603 is performed continuously.

If satisfied in the checking result of the step 603, the timer count is started.

The PN code of the macrocell is searched for a constant time in a step 605. Herewith, the thresholds Rx_T and T_Threshold are used since a boundary line of cells should be defined according to a movement from the microcell to the macrocell so that at this time, a time point to find out a signal of the macrocell is decided by a received power level and a pilot signal strength. In general, in the CDMA system, a time point of the handoff is decided by only the pilot signal strength. Thus, the handoff time point can be also decided by using only the T_Threshold, not using the Rx_T, in the invention.

It is checked in a step 606 whether a PN code value of the searched macrocell is greater than T_ADD and larger than the Ec/Io value of the microcell.

If the PN code value of the searched macrocell is greater than T_ADD in the checking result of the step 606 and larger than the Ec/Io value of the microcell, an idle handoff is performed to the macrocell so as to be serviced in the macrocell, in a step 607.

If the requirement is not satisfied in the step 606, the service is continuously provided to the microcell and simultaneously it is checked in a step 608 whether a timer count value lapses a T_Period value as a given PN searching period. If lapsed in its result, it is repeatedly performed from the step 603 of respectively comparing Ec/Io and a received power level of the microcell signal with Rx_T and T_Threshold.

Figure 7:
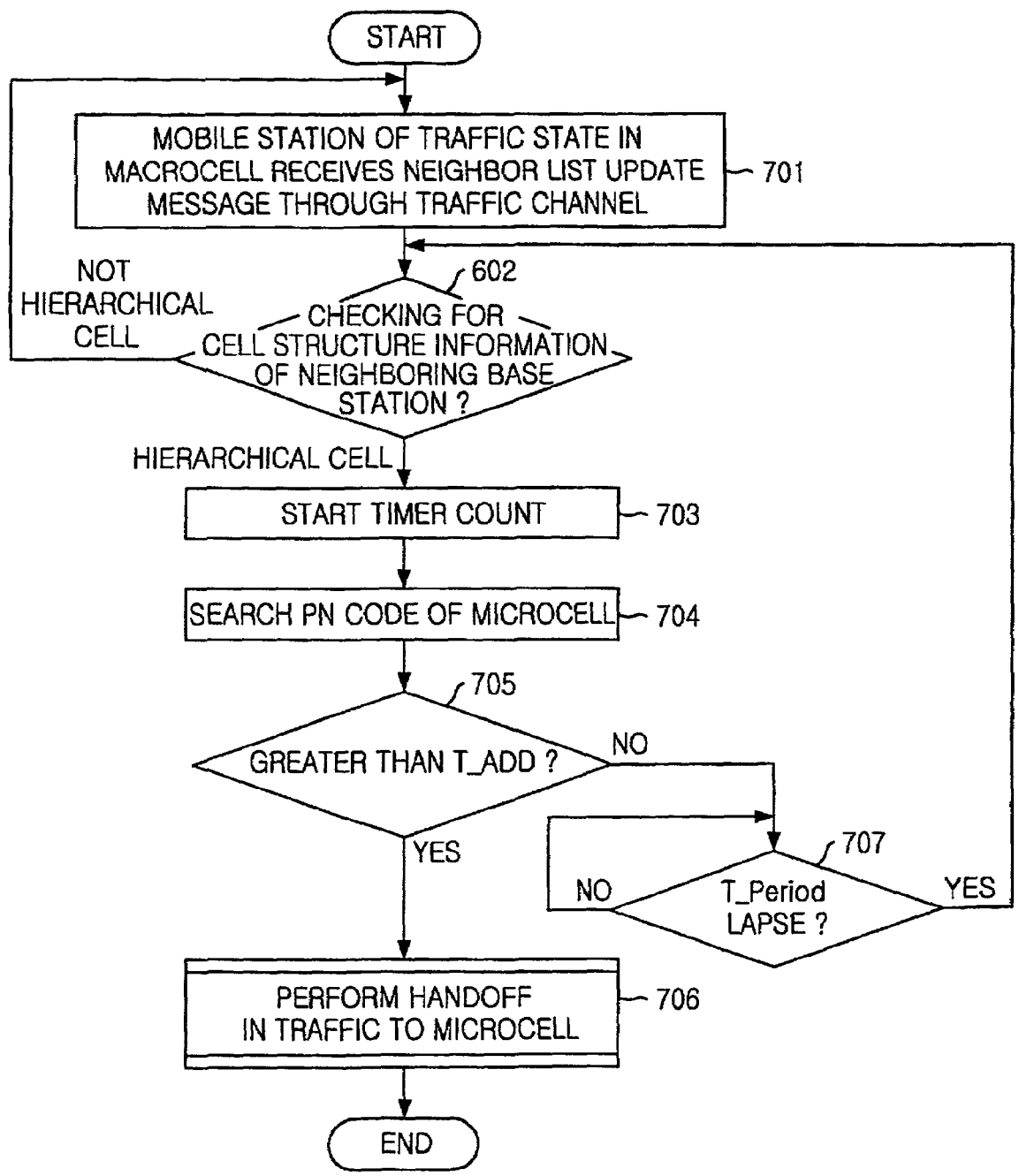
FIG. 7 sets forth a flow chart illustrating a handoff method from a macrocell to a microcell in a traffic state based on one embodiment of the invention.

FIG. 7 is a flow chart illustrating a handoff method from a macrocell to a microcell (picocell) in a traffic state based on one embodiment of the invention.

In traffic, generally, the mobile station does not receive the overhead channel, thus, the mobile station regards a status of the neighboring base station as a status of a call setup. But, when the status is changed by a movement during communication, the base station provides information of the neighboring base stations through the traffic channel. The information of the neighboring base station is provided, being contained into neighbor list update message, and herewith, only the PN code value of the neighboring base station is provided. Therefore, it can not be confirmed that the microcell exists within the macrocell. In order to settle such problem, '1' like a case of a pilot strength measurement message (PSMM) is inserted into an end bit of the neighbor list update message, so the PN code of the microcell is provided, and thereby, the mobile station confirms the PN code of the macrocell through this message and also recognizes that the cell configuration is the hierarchical cell. This case is equally applied to a case that there exists the macrocell outside the microcell.

That is, in a case of the traffic state, a cell distinction of different types in currently servicing cell interior and exterior is noted by providing, as '1', an end bit of a reserved field in the neighbor list update message.

Additionally to this method, it can be used in the traffic state by making a new message such as the neighbor list update message.

That is, in case that the mobile station is under the communication with the macrocell 102 in the hierarchical cell structure, the mobile station periodically searches for the PN code of the primary channel 204 of the microcell shown in FIG. 2 even in communication, since the mobile station recognizes through the neighbor list update message that the microcell (picocell) 104 through 107 exists in the inside of the base station 102 which is under the communication. If the searching result value is greater than the T_ADD, the mobile station performs the handoff in traffic to the microcell.

With reference to FIG. 7, the mobile station under the communication state in the macrocell receives the neighbor list update message through the traffic channel, in a step 701.

The cell structure information of the neighboring base stations contained into the neighbor list update message is clarified in a step 702. If it is not the hierarchical cell type in the clarification result, the step 701 is again performed.

If the hierarchical cell type in the clarification result of the step 702, the timer count is started in a step 703.

The PN code of the microcell is searched for a constant time in a step 704.

It is decided in a step 705 whether a PN code value of the searched microcell is greater than the T_ADD.

Figure 8:
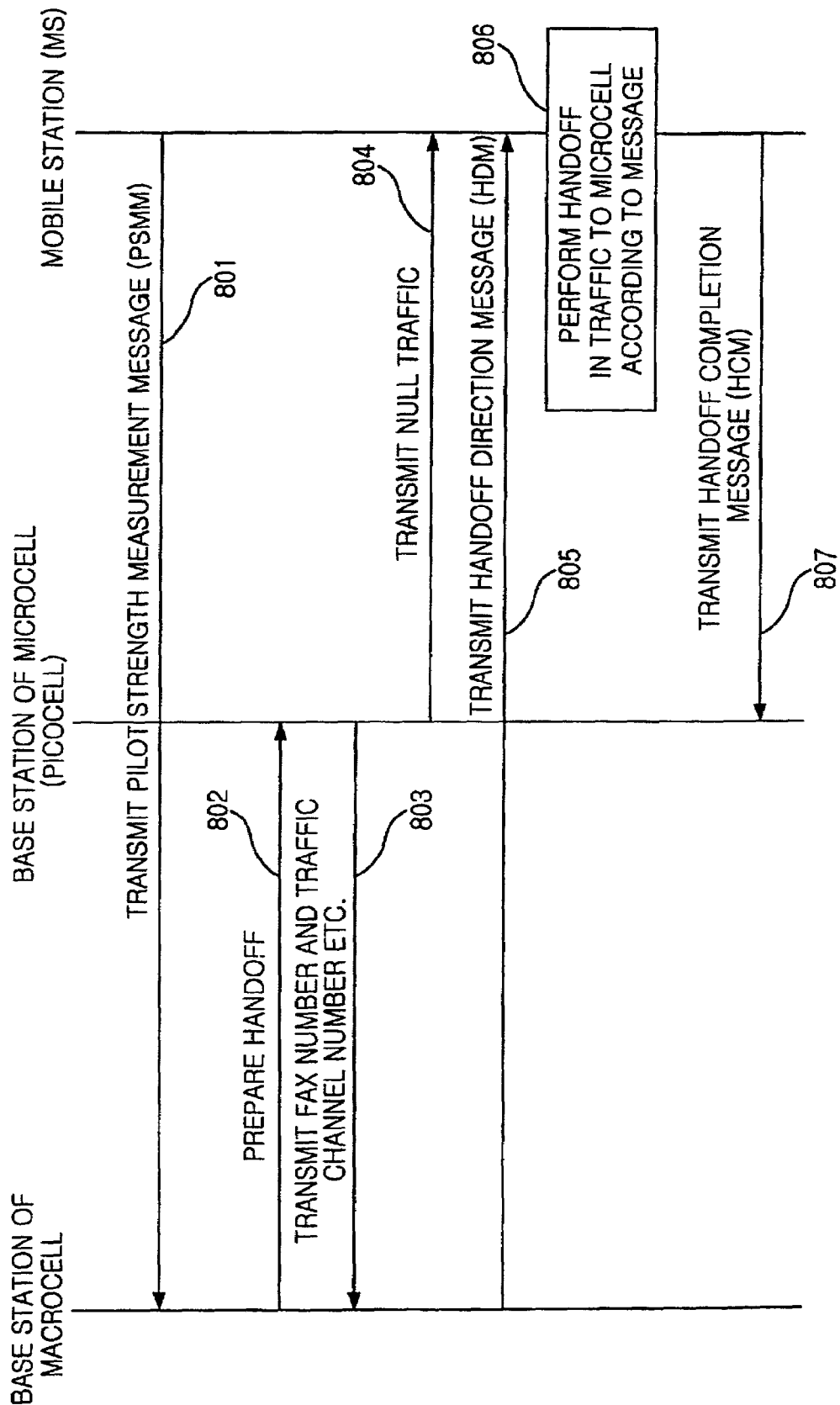
FIG. 8 is a flow chart showing a procedure for a handoff in traffic to the microcell shown in FIG. 7.

If the PN code value of the searched microcell is greater than the T_ADD in the deciding result of the step 705, the handoff in traffic to the microcell is performed in a step 706 as shown in FIG. 8.

If the condition is not satisfied in the deciding result of the step 705, the service is continuously provided to the macrocell and simultaneously it is checked in a step 707 whether the timer count value lapses the T_Period value as the given PN searching period. If lapsed in its result, it is repeatedly performed from the step 702 of clarifying the cell structure information of the neighboring base stations and confirming whether it continuously exists within the hierarchical cell.

FIG. 8 is a flow chart showing one embodiment for a step 706 of performing the handoff in traffic to the microcell of FIG. 7.

If the searched PN code value is greater than the T_ADD, the mobile station transmits the PSMM of FIG. 4 to the base station of the macrocell through a reverse traffic channel in a step 801.

The base station of the macrocell sends, through this signal, information that the mobile station newly enters the base station of the microcell (picocell), to prepare the handoff in a step 802.

The base station of a corresponding microcell (picocell) transmits a traffic channel number and an FA number used by a corresponding mobile station etc. to the base station of the macrocell, in a step 803.

In a step 804, a null traffic is continuously transmitted to the corresponding mobile station.

In a step 805, the base station of the macrocell transmits information required for the handoff, such as the traffic channel number and the FA number etc. to be acquired from the base station of the corresponding microcell (picocell) by the base station itself, to the corresponding mobile station through a handoff direction message (HDM).

The mobile station which has received the HDM performs the handoff in traffic to the base station of the corresponding microcell (picocell), in a step 806.

The handoff is completed by transmitting a handoff completion message to the base station of the corresponding microcell (picocell), in a step 807.

After that, when the communication is finished, the mobile station receives the message through a synchronization channel of the microcell (picocell) having an execution of a corresponding service, to then match the synchronization to a corresponding cell.

Herewith, in a method of informing of the microcell (picocell) in the PSMM, it may become one method that a reserved field is used, and this can be used by differently deciding a message like a pilot strength measurement message 1 (PSMM1) provided from the microcell (picocell) of the hierarchical cells. At this time, the PSMM1 is defined as a signal sent for the handoff by recognizing that the mobile station exists in the microcell of the macrocell interior, or as a signal sent for the handoff by recognizing that the mobile station exists in the macrocell of the microcell exterior.

Figure 9:
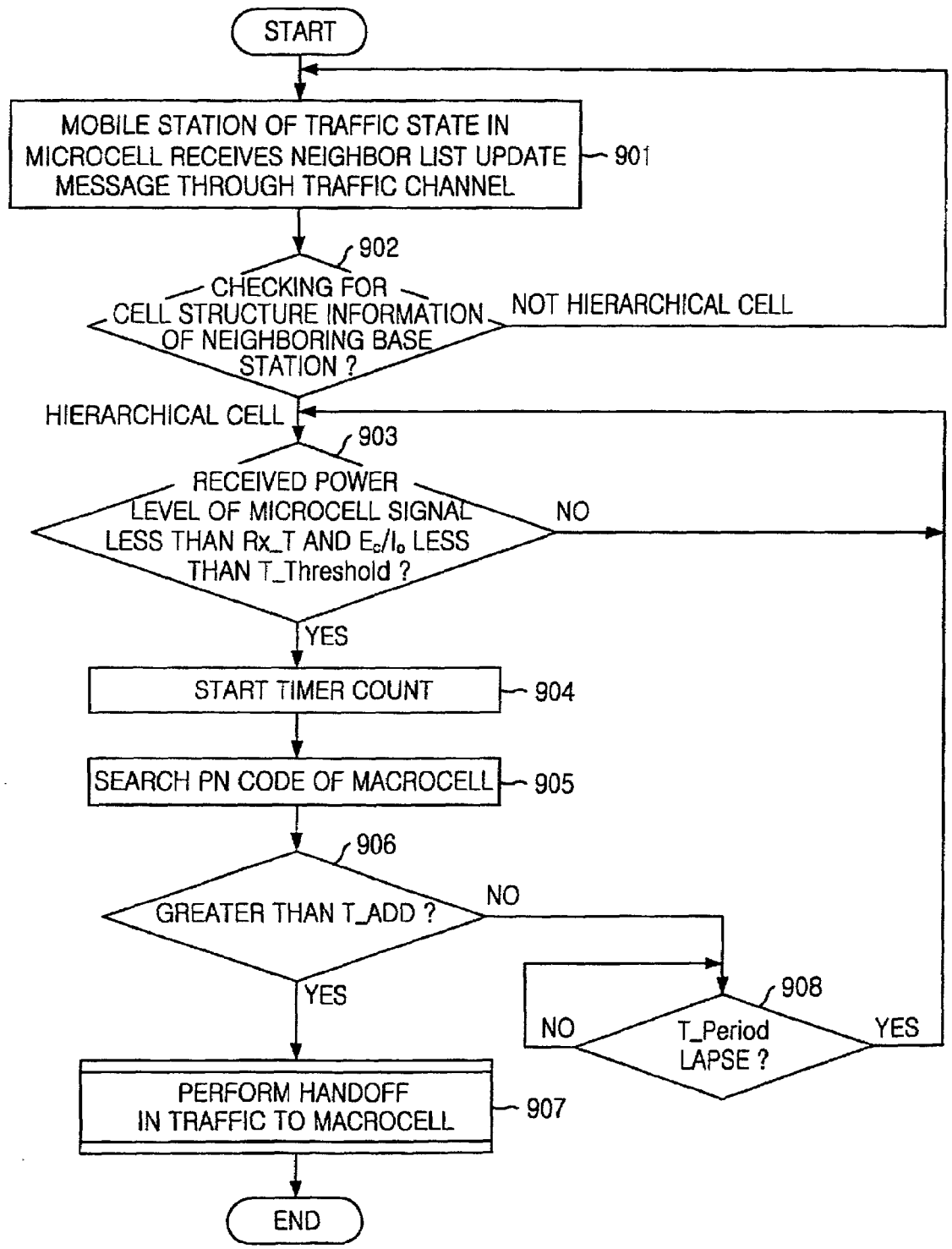
FIG. 9 illustrates a flow chart showing a handoff method from a microcell to a macrocell in a traffic state based on another embodiment of the present invention.

FIG. 9 is a flow chart showing the handoff method from the microcell (picocell) to the macrocell in a traffic state in one embodiment of the present invention.

In case that the mobile station is under the communication with the microcell 104 through 107 in the hierarchical cell structure like FIG. 1, the mobile station can recognize through the neighbor list update message that the macrocell exists outside the base stations 104 through 107 under the communication. Further, the mobile station continuously calculates its own received power levels and the Ec/Io values and if this calculated value is less than a predetermined threshold as a boundary value, the mobile station searches for a corresponding PN code of the primary channel of the exterior macrocell. That is, the mobile station continuously checks the value of the microcell (picocell) then if the received power level is less than the predetermined threshold and if the Ec/Io value is less than the threshold T_Threshold, the timer is operated and the PN code of the macrocell is searched. If the PN code value of the searched macrocell is greater than the T_ADD, the handoff in traffic to the macrocell is performed.

Referring to FIG. 9, the mobile station under the traffic state in the microcell (picocell) receives the neighbor list update message through the traffic channel, in a step 901.

The cell structure information of the neighboring base stations contained into the neighbor list update message is clarified in a step 902. If it is not the hierarchical cell type in the clarification result, the step 901 is performed.

If it is the hierarchical cell type in the clarification result of the step 902, it is checked in a step 903 whether the received power level of the microcell signal is less than the predetermined given threshold Rx_T and the Ec/Io value of the microcell is less than the predetermined given threshold T_Threshold. If the condition is not satisfied in the checking result, the service is continuously provided to the microcell and also the step 903 is repeated.

If the condition is satisfied in the checking result of the step 903, the timer count is started in a step 904.

The PN code of the macrocell is searched for a constant time in a step 905. Herewith, the thresholds Rx_T and T_Threshold are used since a boundary line of cells should be defined according to a movement from the microcell to the macrocell so that at this time, a time point to find out a signal of the macrocell is decided by the received power level and the pilot signal strength. At present, in the CDMA system, a time point of the handoff is decided by the pilot signal strength. Thus, the handoff time point can be also decided by using only the T_Threshold, not using the Rx_T, in the invention, which is why there are many cases that the strength of the pilot signal falls, though the received power level is high in a pilot hierarchical area.

It is decided in a step 906 whether the PN code value of the searched macrocell is greater than the T_ADD.

If the PN code value of the searched microcell is greater than the T_ADD in the deciding result of the step 906, the handoff in traffic is performed in a step 907.

If the condition is not satisfied in the deciding result of the step 906, it is continuously clarified in a step 908 whether the timer count value lapses the T_Period value as the given PN searching period. If lapsed in its result, it is repeatedly performed from the step 903 of comparing the received power level of the microcell signal and the Ec/Io value with the threshold.

Figure 10:
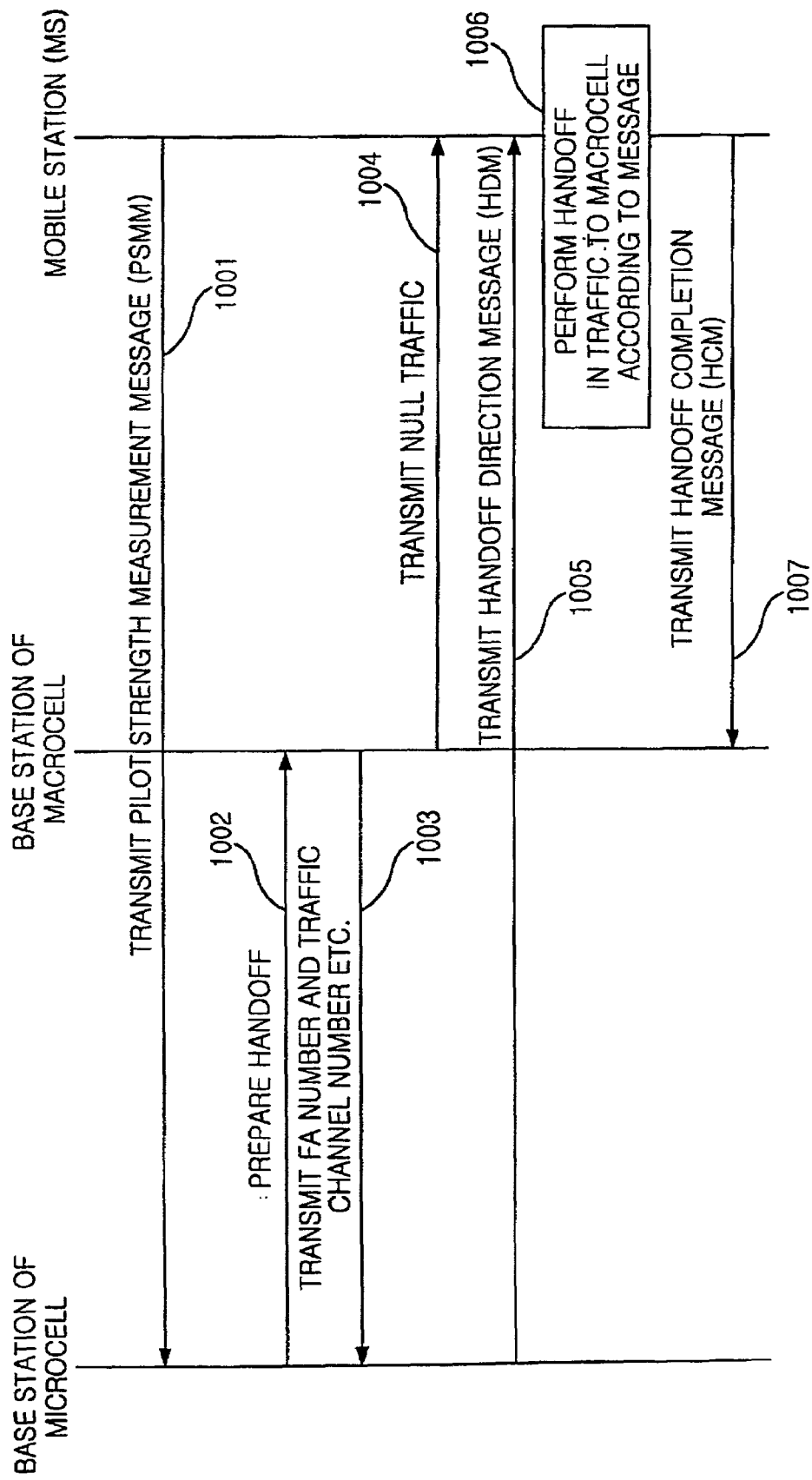
FIG. 10 provides a flow chart representing a procedure for a handoff in traffic to the macrocell shown in FIG. 9.

FIG. 10 is a flow chart representing a procedure of the step 907 to perform the handoff in traffic to the macrocell of FIG. 9.

In FIG. 10, if the searched PN code value is greater than the T_ADD, the mobile station transmits the PSMM of FIG. 4 to the base station of the microcell (picocell) through the reverse traffic channel in a step 1001.

The base station of the microcell recognizes through this PSMM that the mobile station newly enters the macrocell, and sends information for the newly entry of the mobile station into the macrocell to the base station of a corresponding macrocell, so as to prepare the handoff in a step 1002.

The base station of the corresponding mobile station transmits the FA number and the traffic channel number etc. to be used by the corresponding mobile station, to the base station of the microcell in a step 1003.

The null traffic is continuously sent to the corresponding mobile station in a step 1004.

In a step 1005, the base station of the microcell transmits information required for the handoff, such as the traffic channel number and the FA number etc. to be acquired from the base station of the corresponding macrocell by the base station itself, to the corresponding mobile station through the handoff direction message (HDM).

The mobile station which has received the HDM, performs the handoff in traffic to the base station of the corresponding macrocell.

The handoff is completed by transmitting the handoff completion message (HCM) to the base station of the corresponding macrocell in a step 1007.

After that, when the communication is finished, the mobile station receives the message through the synchronization channel of the macrocell which has executed the corresponding service, and matches the synchronization with the corresponding cell. Meantime, when the cell exists independently, the handoff is progressed by the existing system.

Though the handoff in the hierarchical cell is the hard handoff, it can be applied more efficiently and can be progressed similarly to a method using the existing pilot beacon, by performing the handoff as above-mentioned.

Further, a call processing procedure progressed in the handoff is applied thereto, similarly to the existing system. Just, as described above, a software of the mobile station should be changed a little and a message field between the mobile station and the base station should be changed a little, in order for an area distinction between the macrocell and the microcell.

In the invention, the currently using mobile station can be utilized by a little changing only a program, and the hierarchical macrocell and microcell (picocell) can be serviced by simply changing only an operating program of the base station without a change for equipments of the base station, further, the hierarchical cell service is effective with only the existing single mode mobile station instead of the dual-mode mobile station.

In addition, the hierarchical cell service can be realized in the same service band of the cellular movable communication, the personal communication system (PCS) or the next generation movable communication as the IMT-2000, and can be effective with only a software upgrade without a structural change of the base station.

Since the service is provided by allocating only the required number of FAs to the microcell (picocell) in the invention, it is efficient in an aspect of utilizing resources and a work of increasing the FAs can be easily progressed when a capacity of the microcell (picocell) is shortage, which is why the macrocell and the microcell can be progressed independently with each other.

In addition, though the handoff between the hierarchical cells is actually the hard handoff, the handoff is progressed similarly to a system of the handoff through a use of the pilot beacon, to whereby reduce a failure rate of the handoff and heighten a profit by efficiently utilizing channel resources so increasing an overall capacity.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for carrying out an idle handoff from a macrocell to a microcell (picocell) in a hierarchical cell structure, comprising the steps of:
    a) providing different frequency assignments (FA) to the macrocell and the microcell in a same service band, to construct the hierarchical cell structure;
    b) transmitting cell structure information of neighboring base stations and a pseudo noise (PN) code from a base station to a mobile station;
    c) checking whether the mobile station for receiving a service through the macrocell is in the hierarchical cell by using the cell structure information of the neighboring base station; and
    d) checking whether a value of the pseudo noise (PN) code is greater than T_ADD and greater than Ec/Io of the macrocell, by periodically searching the pseudo noise (PN) code of the microcell, to carry out the idle handoff to the microcell, wherein the T_ADD represents a value of a base station pilot strength required for the base station of a neighboring set to be included in a candidate set, the Ec represents pilot energy accumulated during one pseudo noise (PN) chip period, and the Io indicates a total power spectrum density within a reception bandwidth of the macrocell.

2. The method as recited in claim 1, further comprising the step of e) allocating in cross, frequency of the macrocell and the microcell (picocell) to a primary channel and a secondary channel of a number assignment module (NAM) of a single mode mobile station.

3. The method as recited in claim 1, wherein the cell structure information of the neighboring base station is transmitted, being contained into an overhead message of a paging channel.

4. The method as recited in claim 1, wherein the cell structure information of the neighboring base station is transmitted by using a preliminary field or an additional field of a neighbor list message.

5. A method for carrying out an idle handoff from a microcell (picocell) to a macrocell in a hierarchical cell structure, comprising the steps of:
    a) providing different frequency assignments (FA) to the macrocell and the microcell (picocell) in a same service band, to construct the hierarchical cell structure;
    b) transmitting cell structure information of neighboring base stations and a pseudo noise (PN) code from a base station to a mobile station;
    c) checking whether the mobile station for receiving a service through the microcell (picocell) thereof is in the hierarchical cell, by using the cell structure information of the neighboring base station;
    d) deciding a time point of searching for a signal of the macrocell according to a pilot signal strength of a microcell signal; and
    e) checking whether a value of the pseudo noise (PN) code is greater than T_ADD and greater than Ec/Io of the macrocell by periodically searching the pseudo noise (PN) code of the macrocell, to carry out the idle handoff to the macrocell, wherein the T_ADD represents a value of a base station pilot strength required for the base station of a neighboring set to be included in a candidate set, the Ec represents pilot energy accumulated during one pseudo noise (PN) chip period, and the Io indicates a total power spectrum density within a reception bandwidth of the macrocell.

6. The method as recited in claim 5, further comprising the step of f) allocating in cross, frequency of the macrocell and the microcell (picocell) to a primary channel and a secondary channel of a number assignment module (NAM) of a single mode mobile station.

7. The method as recited in claim 5, wherein in said step d), the signal of the macrocell is searched for the sake of the handoff when a received power level of a microcell signal is less than a received level threshold Rx_T which indicates a time point for preparing the handoff and when the Ec/Io of the microcell signal is less than a pilot signal strength threshold T_Threshold which represents the time point of searching the signal of the handoff.

8. The method as recited in claim 5, wherein the cell structure information of the neighboring base station is transmitted, being contained into an overhead message of a paging channel.

9. The method as recited in claim 5, wherein the cell structure information of the neighboring base station is transmitted by using a preliminary field or an additional field of a neighbor list message.

10. A method for carrying out a handoff in traffic from a macrocell to a microcell (picocell) in a hierarchical cell structure, comprising the steps of:
    a) providing different frequency assignments (FA) to the macrocell and the microcell (picocell) in a same service band, to construct the hierarchical cell structure;
    b) transmitting cell structure information of neighboring base stations and a pseudo noise (PN) code from a base station to a mobile station;
    c) checking whether the mobile station in traffic in the macrocell is in the hierarchical cell, by using the cell structure information of the neighboring base station; and
    d) checking whether a value of the pseudo noise (PN) code is greater than T_ADD by periodically searching the pseudo noise (PN) code of the microcell, to carry out the handoff in traffic to the microcell.

11. The method as recited in claim 10, further comprising the step of e) allocating in cross, frequency of the macrocell and the microcell (picocell) to a primary channel and a secondary channel of a number assignment module (NAM) of a single mode mobile station.

12. The method as recited in claim 10, wherein said step d) comprises the steps of:
    d1) transmitting by the mobile station a pilot strength measurement message (PSMM) to the base station of the macrocell through a reverse traffic channel;
    d2) transmitting information to the base station of a corresponding microcell (picocell) to prepare the handoff, according that the base station of the macrocell recognizes that the mobile station enters the microcell (picocell), through the received pilot strength measurement message (PSMM);
    d3) transmitting, by the base station of the microcell (picocell), a frequency assignment (FA) number and a traffic channel number etc. to be used by the mobile station, to the base station of the macrocell, and transmitting a null traffic to the mobile station;

d4) transmitting, by the base station of the macrocell, information required for the handoff, to the mobile station through a handoff direction message (HDM); and d5) performing the handoff in traffic from the mobile station to which the handoff direction message (HDM) was received, to the base station of the microcell (picocell), and transmitting a handoff completion message (HCM) to the base station of the microcell (picocell).

13. The method as recited in claim 10, wherein the cell structure information of the neighboring base station is transmitted, being contained into a neighbor list update message of a traffic channel.

14. The method as recited in claim 10, wherein the cell structure information of the neighboring base station is transmitted by using a preliminary field or an additional field of the neighbor list update message.

15. A method for carrying out a handoff in traffic from a microcell (picocell) to a macrocell in a hierarchical cell structure, comprising the steps of:
a) providing different frequency assignments (FA) to the macrocell and the microcell (picocell) in a same service band, to construct the hierarchical cell structure;
b) transmitting cell structure information of neighboring base stations and a pseudo noise (PN) code, from a base station to a mobile station;
c) checking whether the mobile station for receiving a service through the microcell (picocell) thereof is in the hierarchical cell, by using the cell structure information of the neighboring base station;
d) deciding a time point of searching for a signal of the macrocell according to a pilot signal strength of a microcell signal; and
e) checking whether a value of the pseudo noise (PN) code is greater than T_ADD, by periodically searching the pseudo noise (PN) code of the macrocell, to carry out the handoff in traffic to the macrocell.

16. The method as recited in claim 15, further comprising the step of f) allocating in cross, frequency of the macrocell and the microcell (picocell) to a primary channel and a secondary channel of a number assignment module (NAM) of a single mode mobile station.

17. The method as recited in claim 15, wherein said step e) includes the steps of:
e1) transmitting by the mobile station a pilot strength measurement message (PSMM) to the base station of the microcell (picocell) through a reverse traffic channel;
e2) transmitting information to the base station of a corresponding macrocell to prepare the handoff, according that the base station of the microcell recognizes that the mobile station enters the macrocell, through the pilot strength measurement message (PSMM);
e3) transmitting, by the base station of the macrocell, a frequency assignment (FA) number and a traffic channel number etc. to be used by the mobile station, to the base station of the microcell, and transmitting a null traffic to the mobile station;
e4) transmitting, by the base station of the microcell, information required for the handoff, to the mobile station through a handoff direction message (HDM); and e5) performing the handoff in traffic from the mobile station to which the handoff direction message (HDM) was received, to the base station of the macrocell, and transmitting a handoff completion message (HCM) to the base station of the macrocell.

18. The method as recited in claim 15, wherein in said step d), the signal of the microcell is searched for the sake of the handoff when a received power level of the microcell signal is less than a received power level threshold Rx_T which indicates a time point of searching for a signal of the handoff and when the Ec/Io of the microcell signal is less than a pilot signal strength threshold T_Threshold which represents the time point of searching the signal of the handoff.

19. The method as recited in claim 15, wherein the cell structure information of the neighboring base stations is transmitted, being contained into a neighbor list update message.

20. The method as recited in claim 15, wherein the cell structure information of the neighboring base station is transmitted by using a preliminary field or an additional field of the neighbor list update message.

21. A method for carrying out a handoff between an upper cell and a lower cell in a hierarchical cell structure, comprising the steps of:
a) providing different frequency assignments (FA) to the upper cell and the lower cell in a same service band, to construct a hierarchical cell; and
b) confirming the hierarchical cell according to cell structure information of neighboring base stations, searching for a PN code of a cell where a mobile station is moved to, and performing the handoff and
c) allocating in cross, frequency of the upper cell and the lower cell to a primary channel and a secondary channel of a number assignment module (NAM) of a single mode mobile station.

22. A computer readable medium storing instructions for executing a method for carrying out an idle handoff from a macrocell to a microcell (picocell) in a hierarchical cell structure in a radio communication system having a microprocessor, the method comprising the steps of:
a) providing different frequency assignments (FA) to the macrocell and the microcell (picocell) in a same service band, to construct a hierarchical cell;
b) transmitting cell structure information of neighboring base stations and a pseudo noise (PN) code, from a base station to a mobile station;
c) checking whether the mobile station for receiving a service through the macrocell is in the hierarchical cell, by using the cell structure information of the neighboring base station; and
d) checking whether a value of the pseudo noise (PN) code is greater than T_ADD and greater than Ec/Io of the macrocell, by periodically searching the pseudo noise (PN) code of the microcell, to carry out the idle handoff to the microcell.

23. The computer readable medium as recited in claim 22, wherein the computer has the record of the program to further realize a fifth function of allocating in cross, frequency of the macrocell and the microcell (picocell) to a primary channel and a secondary channel of a number assignment module (NAM) of a single mode mobile station.

24. A computer readable medium storing instructions for executing a method for carrying out an idle handoff from a microcell (picocell) to a macrocell in a hierarchical cell structure in a radio communication system having a microprocessor, the method comprising the steps of:

a) providing different frequency assignments (FA) to the macrocell and the microcell (picocell) in a same service band, to construct a hierarchical cell;
b) transmitting cell structure information of neighboring base stations and a pseudo noise (PN) code, from a base station to a mobile station;
c) checking whether the mobile station for receiving a service through the microcell (picocell) is in the hierarchical cell, by using the cell structure information of the neighboring base station;
d) deciding a time point to find out a signal of the macrocell according to a pilot signal strength of a microcell signal; and
e) checking whether a value of the pseudo noise (PN) code is greater than T_ADD and greater than Ec/Io of the microcell, by searching the pseudo noise (PN) code of the macrocell, to carry out the idle handoff to the macrocell.

25. The computer readable medium as recited in claim 24, wherein the computer has the record of the program to further realize a sixth function of allocating in cross, frequency of the macrocell and the microcell (picocell) to a primary channel and a secondary channel of a number assignment module (NAM) of a single mode mobile station.

26. A computer readable medium storing instructions for executing a method for carrying out a handoff in traffic from a macrocell to a microcell (picocell) in a hierarchical cell structure in a radio communication system having a microprocessor, the method comprising the steps of:
a) providing different frequency assignments (FA) to the macrocell and the microcell (picocell) in a same service band, to construct a hierarchical cell;
b) transmitting cell structure information of neighboring base stations and a pseudo noise (PN) code, from a base station to a mobile station;
c) checking whether the mobile station communicating with the macrocell is in the hierarchical cell, by using the received cell structure information of the neighboring base station; and
d) checking whether a value of the pseudo noise (PN) code is greater than T_ADD, by periodically searching the pseudo noise (PN) code of the microcell, to carry out the handoff in traffic to the microcell.

27. The computer readable medium as recited in claim 26, wherein the computer has the record of the program to further realize a fifth function of allocating in cross, frequency of the macrocell and the microcell (picocell) to a primary channel and a secondary channel of a number assignment module (NAM) of a single mode mobile station.

28. A computer readable medium storing instructions for executing a method for carrying out a handoff in traffic from a microcell (picocell) to a macrocell in a hierarchical cell structure in a radio communication system having a microprocessor, the method comprising the steps of:
a) providing different frequency assignments (FA) to the macrocell and the microcell (picocell) in a same service band, to construct a hierarchical cell;
b) transmitting cell structure information of neighboring base stations and a pseudo noise (PN) code, from a base station to a mobile station;
c) checking whether the mobile station for receiving a service through the microcell (picocell) is in the hierarchical cell, by using the received cell structure information of the neighboring base station;
d) deciding a time point to find out a signal of the macrocell according to a pilot signal strength of a microcell signal; and
e) checking whether a value of the pseudo noise (PN) code is greater than T_ADD, by periodically searching the pseudo noise (PN) code of the macrocell, to carry out the handoff in traffic to the macrocell.

29. The computer readable medium as recited in claim 28, wherein the computer has the record of the program to further realize a sixth function of allocating in cross, frequency of the macrocell and the microcell (picocell) to a primary channel and a secondary channel of a number assignment module (NAM) of a single mode mobile station.

30. A computer readable medium storing instructions for executing a method for carrying out a handoff between an upper cell and a lower cell in a hierarchical cell structure in a radio communication system having a microprocessor, the method comprising the steps of:
a) providing different frequency assignments (FA) to the upper cell and the lower cell in a same service band, to construct a hierarchical cell; and
b) clarifying the hierarchical cell according to cell structure information of neighboring base stations, searching for a PN code of a cell where a mobile station is moved to, and performing the handoff
Wherein the computer has the record of the program to further realize a third function of allocating in cross, frequency of the upper cell and the lower cell to a primary channel and a secondary channel of a number assignment module (NAMJ) of a single mode mobile station.

* * * * *